(12) United States Patent
Koga

(10) Patent No.: US 6,675,124 B2
(45) Date of Patent: Jan. 6, 2004

(54) ROTATIONAL ANGLE MEASURING APPARATUS

(75) Inventor: Osamu Koga, Tokyo (JP)

(73) Assignee: Niles Parts Co., Ltd. (JP)

( * ) Notice: Subject to any disclaimer, the term of this patent is extended or adjusted under 35 U.S.C. 154(b) by 19 days.

(21) Appl. No.: 10/041,970

(22) Filed: Jan. 9, 2002

(65) Prior Publication Data

US 2002/0111763 A1 Aug. 15, 2002

(30) Foreign Application Priority Data

Jan. 18, 2001 (JP) .................................. P2001-009822

(51) Int. Cl.[7] .......................... G06F 15/00; G01C 19/00
(52) U.S. Cl. .............. 702/151; 324/207.2; 324/207.25; 702/150
(58) Field of Search .......................... 702/41, 105, 150, 702/151, 167; 701/36; 324/165, 207.2, 207.25; 180/405, 446; 280/5.512

(56) References Cited

U.S. PATENT DOCUMENTS 6,424,147 B1 * 7/2002 Kato et al. ................ 324/207.2

6,519,549 B1 * 2/2003 Lin et al. .................... 702/151

FOREIGN PATENT DOCUMENTS

| JP | 11-287608 | 10/1999 |
| JP | 2000-88605 | 3/2000 |

* cited by examiner

*Primary Examiner*—John Barlow
*Assistant Examiner*—John Le
(74) *Attorney, Agent, or Firm*—Rader, Fishman & Grauer PLLC

(57) ABSTRACT

Steering angle detecting apparatus of a steering is constituted to dispense with reexecution of initial setting by a simple angle sensor. CPU is connected with an MR sensor attached to a rotating member rotated in cooperation with a steering shaft for detecting a periodic angular position and CPU subjects data from the MR sensor to an operation processing by using a reference position stored to an involatile data storing portion to thereby calculate an absolute steering angle including a number of an order of turns. When an ignition is made OFF, there is constituted a low current consumption mode for carrying out calculation by intermittent operation and power source to the MR sensor is made OFF by a sensor switch. The reference position is stored to the involatile data storing portion and therefore, even after detaching and attaching a battery, initial setting is dispensed with.

17 Claims, 5 Drawing Sheets

ROTATIONAL ANGLE MEASURING APPARATUS

BACKGROUND OF THE INVENTION

1. Field of the Invention

The present invention relates to a rotational angle measuring apparatus used in detecting a steering angle of a steering of a vehicle or the like.

2. Description of the Related Art

As a rotational angle measuring apparatus, there is provided, for example, an apparatus of detecting a steering angle of a steering for automatic control for controlling an irradiating direction of a headlamp variably to the left and to the right in cooperation with a steering wheel in a vehicle or the like. In detecting such a steering angle, the steering wheel is rotated by several turns respectively to the left and to the right and therefore, it is requested that a rotational angle of a steering shaft exceeding 360 degrees can be measured.

As such a steering angle detecting apparatus, there is provided a constitution disclosed in Japanese Patent Laid-Open No. 287608/1999.

According to the apparatus, a slit is provided at a light blocking plate fixed to a steering shaft, a relative rotational angle of the light blocking plate is detected by a photointerruptor in which a light emitting element and a light receiving element are opposed to each other, a resistance value of a variable resistor is changed by an intermittently driven gear set rotated intermittently for respective single turn of the steering shaft, a number of turns (frequencies) by a unit of 360 degrees is detected and an operation is executed by combining detected results of these to thereby calculate a steering angle constituting an absolute rotational angle.

According to the steering angle detecting apparatus, for example, when an ignition switch is made OFF and thereafter the ignition switch is made ON again, the number of turns of the steering shaft is immediately known by the resistance value of the variable resistor and therefore, when the relative rotational angle is found, the absolute rotational angle is also provided easily.

However, according to the above-described steering angle detecting apparatus, a number of parts is large and therefore, there poses a problem that cost is increased and the mountability is poor in a narrow space around the steering shaft.

Hence, as other steering angle detecting apparatus reducing a number of parts, there is provided a constitution disclosed in Japanese Patent Laid-Open No. 88065/2000.

According to the apparatus, there is used a photointerruptor comprising a reference position sensor and two of relative position sensors with regard to a light blocking plate and by tracking signals of these and subjecting the signals to an operational processing by CPU, a steering angle exceeding 360 degrees is detected while dispensing with a variable resistor driven by an intermittently driven gear set or the like.

In this case, the signal of the photointerruptor needs to monitor always, when data of the steering angle is not used as in the case in which the ignition switch is made OFF, in order to restrain power consumption of a battery, there is brought about a sleep state in which one of the relative position sensors is left and power supply to other of the sensors is made OFF. Further, when rotation of the steering shaft is detected by an operating one of the relative position sensors, the sleep state is released.

Power is supplied intermittently to the operating one of the relative position sensors.

However, in order to detect a small amount of rotational movement of the steering shaft, there is selected the relative position sensor operated in the sleep state with respect to the densest slits among slits formed at the light blocking plate. Therefore, in order to avoid a failure in detecting a number of slits passing through the relative position sensor in accordance with steering speed, an interval of power supply to the relative position sensor needs to be extremely short in correspondence with an interval between slits and there poses a problem that current consumption is not reduced as aimed.

Meanwhile, in a vehicle, large current is consumed in cranking in starting an engine and there poses a problem that voltage of the battery is lowered and therefore, a capacitor having a large capacitance needs to be provided at a power source portion of the steering angle detecting apparatus in order to maintain stable operation of an inner circuit of the steering angle detecting apparatus and therefore, large-sized formation and high cost of the apparatus are unavoidable.

Further, in the case in which a period at an order of turns is not detected directly but detected by tracking the signal of the relative position sensor indicating an angular position in the period, when the steering shaft is rotated by one turn or more after removing the battery of the vehicle constituting the power source, erroneous data is constituted even when the frequency is preserved in a memory and therefore, initial setting needs to carry out again.

SUMMARY OF THE INVENTION

Therefore, in view of the above-described problems of the related art, it is an object of the invention to provide a rotational angle measuring apparatus capable of remarkably reducing power consumption at a pose in which detected data is not used, realized by a simple constitution, dispensing with reexecution of initial setting and suitable for detecting a steering angle of a steering.

Hence, according to a first aspect of the invention, there is provided a rotational angle measuring apparatus comprising a rotating member rotated in cooperation with a rotating body constituting an object of measurement, an angle sensor attached to the rotating member for detecting a periodic angular position thereof, an involatile data storing portion for storing a reference position of the angle sensor, and operating and controlling means for subjecting the reference position and detected data from the angle sensor to an operational processing to thereby calculate a frequency of the rotating body constituting the object of measurement and calculating an absolute rotational angle of the rotating body constituting the object of measurement to thereby constitute a measured output, wherein the operating and controlling means switches a mode thereof from a normal operation mode for continuously reading the detected data from the angle sensor and executing the operational processing to a low current consumption mode for executing the operational processing by reading the detected data from the angle sensor by an intermittent operation by receiving a pause signal from outside.

The reference position of the angle sensor is stored to the involatile data storing portion and therefore, while constructing the angle sensor by a simple constitution of detecting a periodic angular position, initial setting needs not to execute again after detaching or attaching a power source.

In the intermittent operation of the operating and controlling means in the low current consumption mode, an interval of the intermittent operation may be to the degree of tracking a change in a frequency and therefore, current consumption is remarkably reduced.

According to a second aspect of the invention, particularly, a plurality of angle sensors are constituted and the operating and controlling means constitutes a measured output by an average value of absolute rotational angles based on the respective angle sensors.

According to a third aspect of the invention, the operating and controlling means determines that an abnormality is caused when a difference between the absolute rotational angles based on the angular positions detected by the detective angle sensors is larger than a predetermined values.

According to a fourth aspect of the invention, in the operating and controlling means, when there is present an absolute rotational angle in which a difference between the absolute rotational angle and an average value of absolute rotational angles based on the angular positions detected by the respective angle sensors, is larger than a predetermined value, the measured output is constituted by an average value of other absolute rotational angles by excluding the absolute rotational angle.

The absolute rotational angle having a large difference from the average value is excluded as abnormal and therefore, accuracy of the measured output is promoted.

According to a fifth aspect of the invention, the rotating body constituting the object of measurement is a steering shaft, the measured output is a steering angle and the pause signal is a signal for making an ignition switch off.

The low current consumption mode is constituted when the ignition switch is made off, which does not need the measured output of the steering angle and therefore, power consumption of a vehicle-mounted battery is reduced.

According to a sixth aspect of the invention, the operating and controlling means sets a frequency to null by an angular position when the vehicle is determined to be brought into a linearly advancing state based on a signal from a sensor for detecting a behavior of the vehicle when a power source has been removed and thereafter connected again.

Even when the steering shaft is rotated during a time period in which the power source is removed, the frequency is automatically set to null correctly when the vehicle is brought into the linearly advancing state.

According to a seventh aspect of the invention, the rotating body constituting the object of measurement is the steering shaft of the vehicle and particularly in the third aspect of the invention, when the operating and controlling means determines that an abnormality is caused, a range of the steering angle is calculated based on a signal from a sensor for detecting a behavior of the vehicle and the steering angle is outputted as the measured output based on an absolute rotational angle produced by excluding an absolute rotational angle deviated from the range of the steering angle.

The absolute rotational angle deviated from the range of the steering angle is excluded and therefore, accuracy of the steering angle is promoted.

According to an eighth aspect of the invention, in the low current consumption mode, a power source is supplied to the angle sensor only in an intermittent operation of the operating and controlling means.

In addition to a reduction in current consumption of the operating and controlling means per se, power consumption by the angle sensor is also reduced.

According to a ninth aspect of the invention, the operating and controlling means monitors a voltage of the power source and constitutes the low current consumption mode when the voltage becomes lower than a predetermined voltage.

By reducing power consumption in low voltage, operation of the operating and controlling means and the like are prevented from being unstable.

DESCRIPTION OF THE PREFERRED EMBODIMENTS

An explanation will be given of a mode for carrying out the invention applied to detecting a steering angle of a vehicle by embodiments as follows.

Figure 1A:
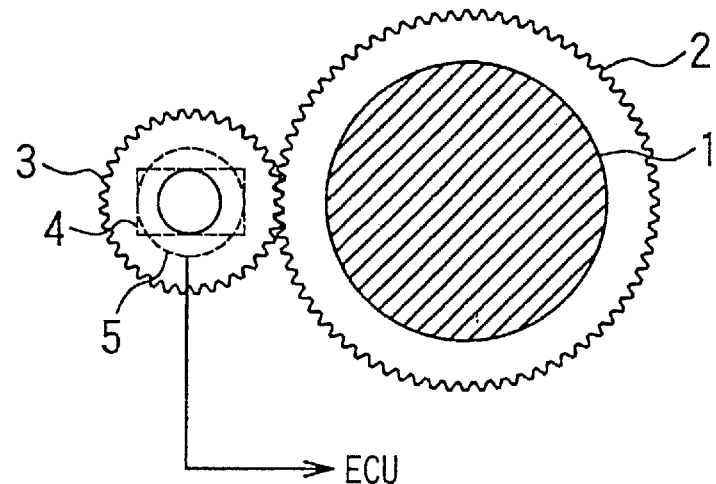
FIG. 1 illustrates views showing a total constitution of a first embodiment according to the invention.
Figure 1B:
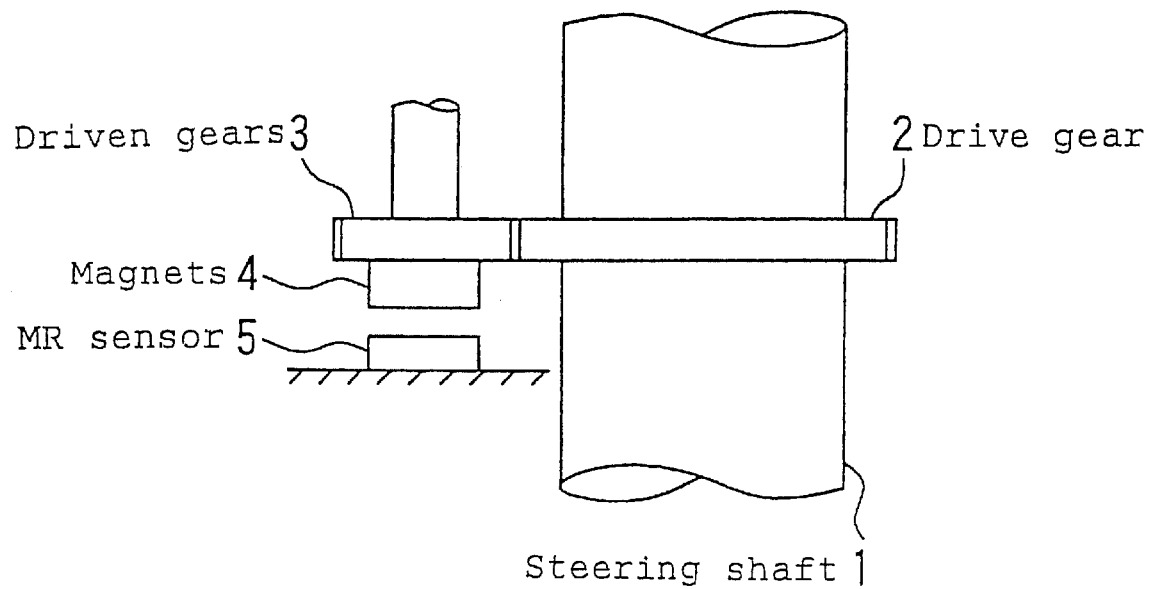

FIG. 1 illustrates a total constitution of a first embodiment. FIG. 1A is a plane view viewing a steering shaft in an axial direction thereof and FIG. 1B is a side view thereof.

A drive gear 2 is connected to a steering shaft 1 as a rotating body constituting an object of measurement and is rotated integrally with the steering shaft 1. The drive gear 2 is brought in mesh with a driven gear 3 and a magnet 4 is fixed to a rear face of the driven gear 3.

On a lower side of the driven gear 3, an MR (magnetoresistive) sensor 5 is attached to a fixed member on a side of a vehicle body opposedly to the magnet 4 for detecting rotation of the driven gear 3 integral with the magnet 4 by a change in a magnetic field. That is, the MR sensor 5 uniquely detects an angular position of the driven gear 3 in a half rotation (one period) and outputs a periodic angular position in correspondence with rotation of the driven gear 3.

The driven gear 3 fixed with the magnet 4 corresponds to a rotating member according to the invention and the MR sensor 5 corresponds to an angle sensor.

An output of the MR sensor 5 is outputted to an electronic control unit (ECU) 10.

Figure 2:
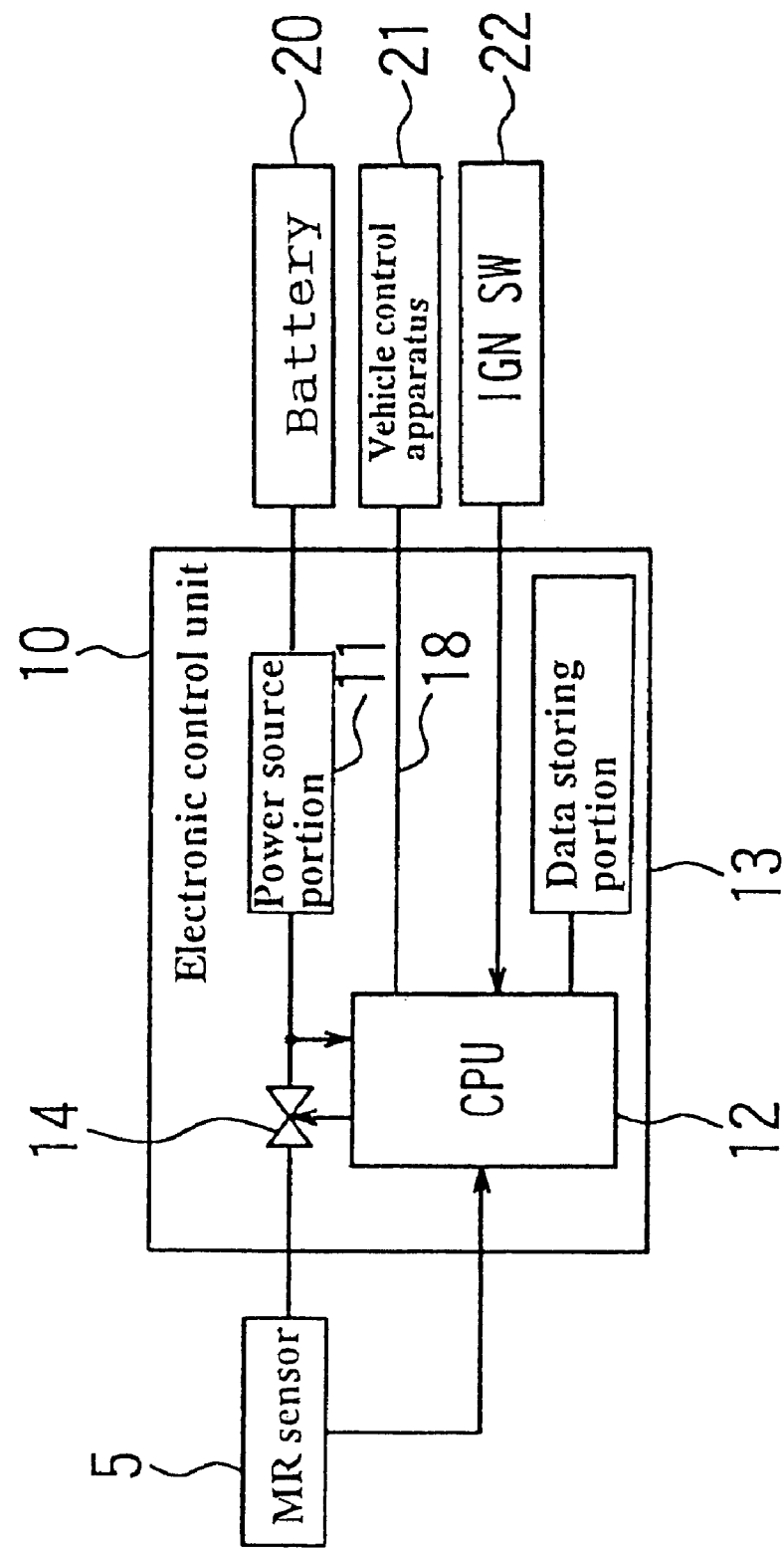
FIG. 2 is a block diagram showing a constitution of an electronic control unit.

As shown by FIG. 2, the electronic control unit 10 is provided with CPU 12 for receiving an output signal from the MR sensor 5 and a power source portion 11 and CPU 12 is connected with a data storing portion 13 comprising an involatile memory.

The power source portion 11 is directly connected to a battery 20 mounted on a vehicle for changing battery voltage to predetermined voltage for operating the MR sensor and supplying the predetermined voltage to the MR sensor 5. A sensor switch 14 controlled by CPU 12 is provided between the power source portion 11 and the MR sensor 5.

CPU 12 is further connected with a vehicle control apparatus 21 by a communication line 18 and inputted with ON and OFF signals of an ignition switch (IGN SW) 22.

CPU 12 executes a predetermined operational processing based on the output signal from the MR sensor 5 and outputs a steering angle of the steering shaft 1 to the communication line 18 as operating and controlling means according to the invention.

Next, an explanation will be given of operation in the above-described constitution.

The MR sensor 5 outputs the periodic angular position in correspondence with rotation of the driven gear 3 as described above and accordingly, when a number of teeth of the drive gear 2 is designated by notation m, a number of teeth of the driven gear 3 is designated by notation n, a rotational angle of the driven gear 3 is designated by notation β and particularly, an angular position in a period of the driven gear 3 at an s-th period is designated by notation γ, the steering angle α of the steering shaft 1 is represented as follows.

$$\alpha = (n/m) \times \beta$$

here, $$= (n/m) \times (\gamma - \gamma 0 + s \times 180°)$$

where notation γ0 designates a reference position and corresponds to a linearly advancing position.

Figure 3:
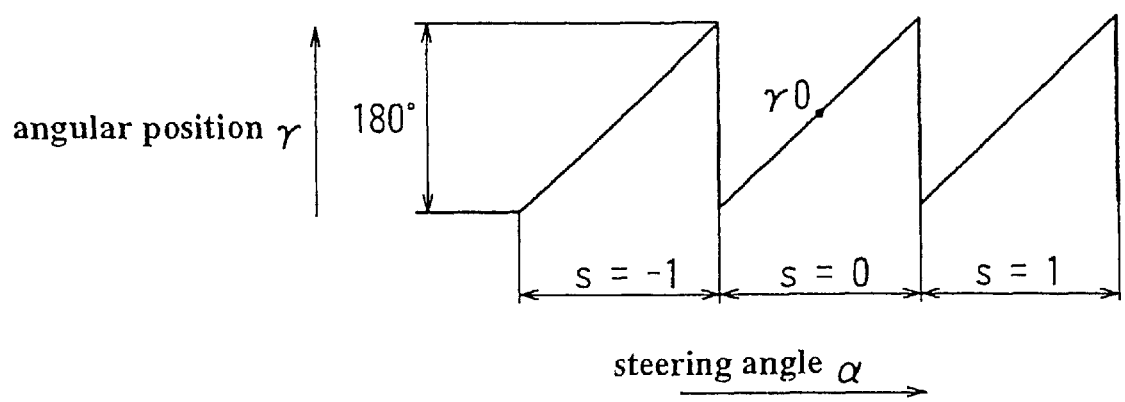
FIG. 3 is a diagram showing a relationship between a steering angle and an angular position in a period.

A relationship between the steering angle α and the angular position γ in the period is as shown by FIG. 3.

Further, with regard to the reference position γ0, when the MR sensor 5 is installed to the driven gear 3, the vehicle is brought into a linearly advance state and γ at that occasion is set to γ0 and a frequency at that occasion is set as s=0, which are initially set from outside via the communication line 18 and respectively stored to the data storing portion 13.

The above-described operation is executed at CPU 12 in the electronic control unit 10 and a change in the frequency s is provided by tracking the above-described angular position γ.

By always operating the electronic control unit 10 for tracking the angular position γ also when the vehicle is not operated, power of the battery 20 is consumed and therefore, according to the embodiment, there is brought about a low current consumption mode during a time period of making the ignition switch OFF in contrast to a normal operation mode when the ignition switch is made ON.

According to the low current consumption mode, the electronic control unit 10 is brought into a state of operating only a clock circuit, not illustrated, in CPU 12 and a clock generator for intermittent operation, mentioned later.

Further, in this mode CPU 12 also cuts power supply to the MR sensor 5 by making the sensor switch 14 OFF.

Figure 4:
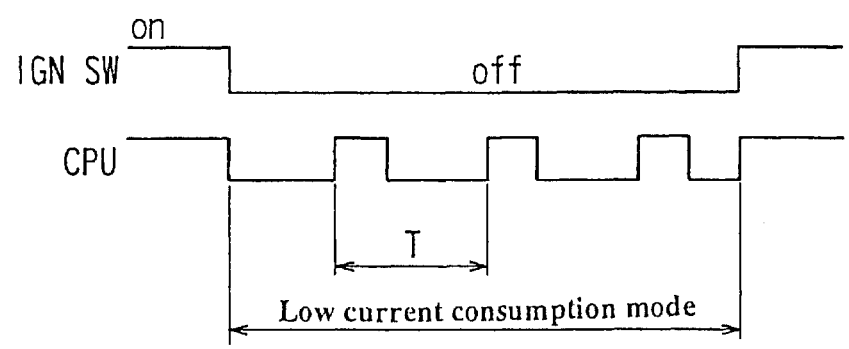
FIG. 4 is a diagram showing a state of intermittent operation.

Further, CPU 12 is operated intermittently by timings as shown by FIG. 4 by the clock generator, supplies power to the MR sensor 5 by making the sensor switch 14 ON only during the time period and reads the angular position γ of driven gear 3 from the MR sensor 5.

Based on a transitional change of the angular position γ read by the intermittent operation, to what turn the driven gear 3 is brought, that is, the frequency s is calculated and the frequency s is stored to the data storing portion 13.

A period T of the intermittent operation is set under the following condition for accurately detecting the change in the frequency s.

$$T \leq (n/m) \times 180° / 2B$$

where notation B designates a maximum steering angular velocity in normal operation.

Meanwhile, according to a normal operation mode of the electronic control unit 10, CPU 12 monitors an output of the power source portion 11. Further, when voltage is lowered by a predetermined value or more by cranking in starting the engine or the like, the mode is switched from the normal operation mode to the low current consumption mode to thereby reduce the current consumption.

When output voltage of the power source portion 11 is recovered, the mode returns to the normal mode again.

The steering angle detecting apparatus according to the embodiment is constituted as described above and with regard to the driven gear 3 rotated in cooperation with the steering shaft 1, the number in the order of periods is calculated by tracking the angular position γ at the respective period detected by the MR sensor 5 to thereby detect the steering angle of the steering shaft 1 and during the time period in which the ignition switch 22 is made OFF, the low current consumption mode is constituted and the angular position γ is tracked by intermittent operation by a minimum function such as the clock circuit of CPU 12.

The intermittent operation may only check the change in the period and accordingly, an allowance can be provided to an interval of operation and current consumption of the electronic control unit 10 and the MR sensor 5 can remarkably be reduced.

Further, during the intermittent operation, the angular position γ and the frequency s necessary for operation of detecting the steering angle are stored to the data storing portion 13 along with the reference position γ0 and therefore, when the ignition switch 22 is made ON in successive operation, it is not necessary to newly execute initial setting for detecting the steering angle.

Further, the low current consumption mode is constituted even when voltage is lowered by cranking in starting the engine and therefore, even when the capacitor to be provided to the power source portion 11 is not constituted by a large capacitance, stable operation of CPU 12 and the data storing portion 13 is maintained, there is not a concern of losing data of the angular position γ or the frequency s being used in detection control and therefore, the constitution of the power source portion 11 can be made inexpensive and small-sized.

Figure 5:
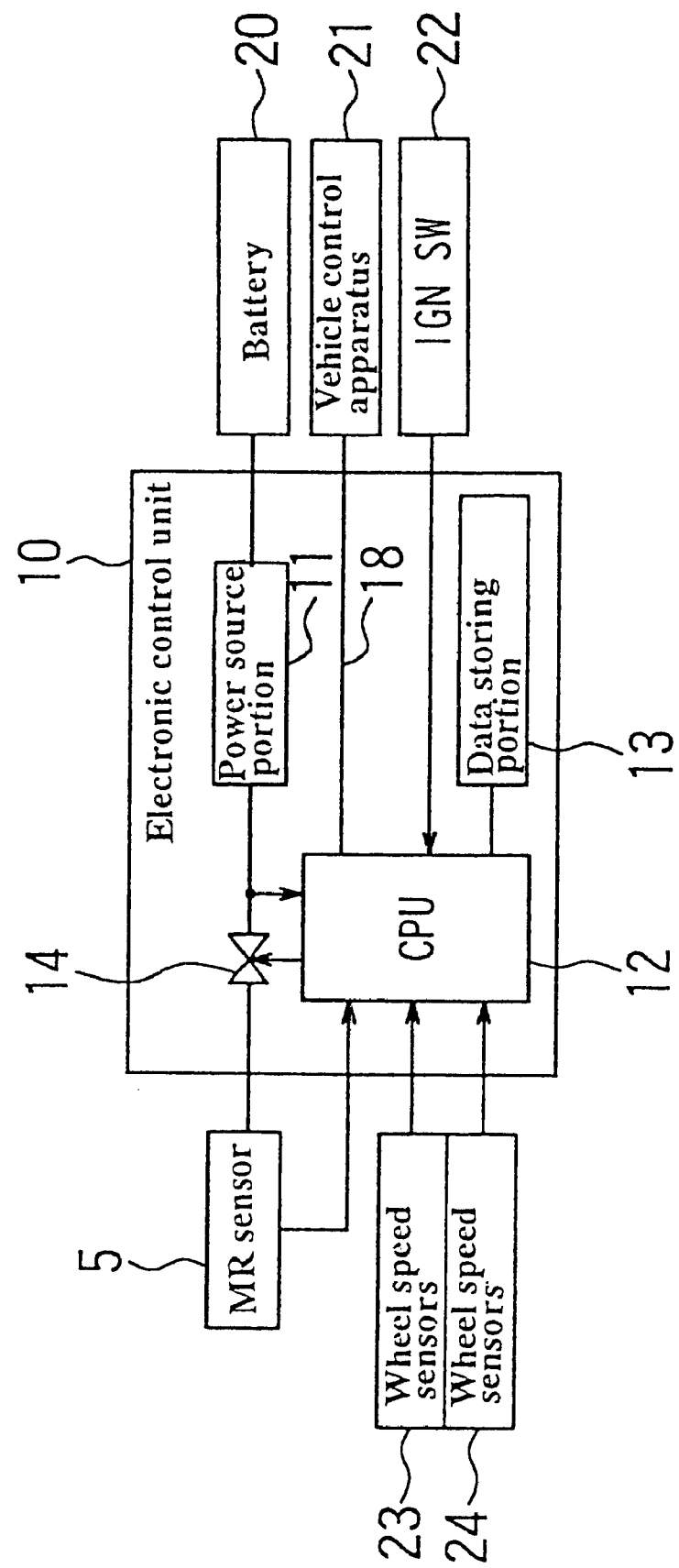
FIG. 5 is a block diagram showing a second embodiment.

Next, FIG. 5 is a block diagram showing a second embodiment.

According thereto, in addition to the constitution of the first embodiment, a wheel speed sensor is connected to CPU 12 of the electronic control unit 10.

The linearly advancing state of the vehicle is detected by CPU 12 by inputting signals of wheel speed sensors 23 and 24 for detecting speeds of left and right wheels of the vehicle. A way of detecting the linearly advancing state based on the wheel speed is disclosed in, for example, Japanese Patent Laid-Open No. 15270/1985. Further, the signals of the vehicle speed sensors 23 and 24 are used for detecting a behavior of the vehicle by the vehicle control apparatus 21 or the like and therefore, the measured signals can be used.

According to the electronic control unit 10, when connected to the battery 20 which has been mounted again after removing the battery of the vehicle, the linearly advancing state of the vehicle is detected by CPU 12 and the frequency is reset to s=0.

The other constitution is the same as that of the first embodiment.

As described above, when the MR sensor 5 is initially installed, the vehicle is brought into the linearly advancing state and the angular portion at that occasion is fixed to the reference position γ0, which is initially set from outside via the communication line 18 and stored to the data storing portion 13 and the frequency is set as s=0 to thereby start the control. Therefore, so far as the drive gear 2, the driven gear 3 or the MR sensor 5 is not removed, the reference position γ0 remains unchanged from that stored to the data storing portion 13.

However, even when the frequency s is stored to the data storing portion 13 constituted by the involatile memory, the frequency s becomes different from a stored value of the data storing portion 13 when the steering shaft 1 is rotated to exceed one period during a time period of removing the battery 20.

Hence, according to the embodiment, when the battery 20 is newly connected, the linearly advancing state of the vehicle is detected from signals of the vehicle speed sensors 23 and 24 and the frequency is automatically reset to s=0 by the angular position at that occasion.

The embodiment is operated as described above and therefore, in addition to the effect of the first embodiment, there is achieved an effect in which even when the battery 20 is detached or attached, troublesome resetting operation for detecting the steering angle is dispensed with.

Next, an explanation will be given of the third embodiment.

Figure 6:
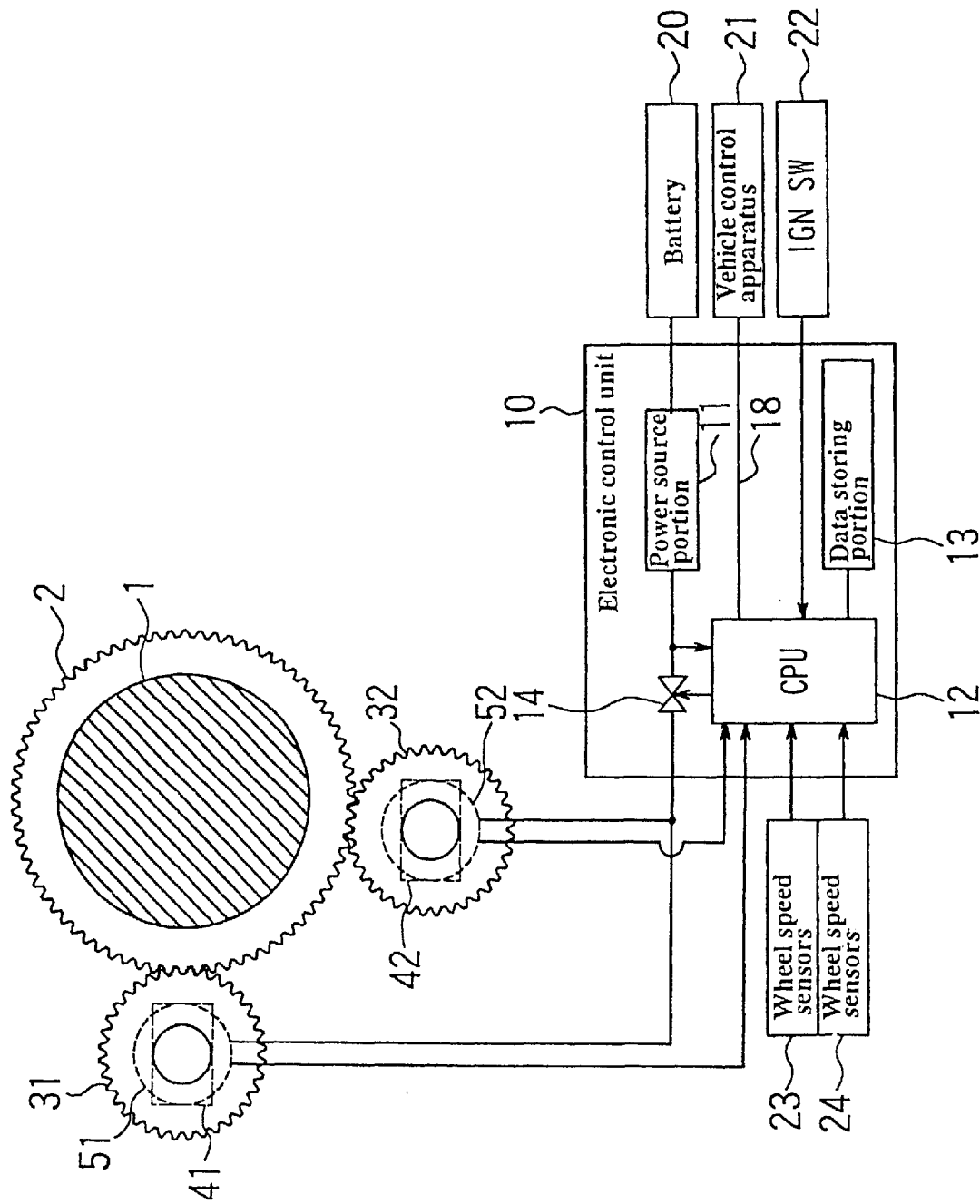
FIG. 6 is a view showing a third embodiment.

As shown by FIG. 6, the drive gear 2 according to the first embodiment is brought in mesh with two of a first and a second driven gear 31 and 32 to respectives of which a first and a second MR sensor 51 and 52 are attached and detected signals thereof are outputted to the electronic control unit 10. The first and the second driven gears 31 and 32 are respectively fixed with magnets 41 and 42.

Further, CPU 12 is inputted with the signals of the wheel speed sensors 23 and 24.

According to the electronic control unit 10, in CPU 12, similar to the previous embodiment, there are calculated α1 and α2 as follows based on signals from the first and second MR sensors 51 and 52.

$$\alpha 1=(n/m)\times(\gamma 1-\gamma 01+s1\times 180°)$$

$$\alpha 2=(n/m)\times(\gamma 2-\gamma 02+s2\times 180°)$$

where suffixes of 1 and 2 attached to respective variables designate values related to the first and the second MR sensors 51 and 52.

Next, there is calculated a difference between α1 and α2 or Δα=|α1−α2| and it is checked whether a state of Δα>ε is brought about. When both of the first and the second MR sensors 51 and 52 are normal, the difference Δα falls in a range of an allowable error ε calculated from constituent parts.

Thereby, there can be detected occurrence of abnormality in either of routes related to the first and the second MR sensors 51 and 52.

When the difference Δα falls in the range of the allowable error ε, CPU calculates an average of α1 and α2, mentioned above, as in the following equation and output the average to the communication line 18.

$$\alpha=(\alpha 1+\alpha 2)/2$$

Meanwhile, in the case of Δα>ε, the range of the steering angle is predicted from the signals of the wheel speed sensors 23 and 24 and one of α1 and α2 deviated from the predicted range of the steering angle, is excluded as abnormal and a value of a remaining one of α1 and α2 is set to the steering angle α.

The other constitution is the same as that of the second embodiment.

According to the embodiment, the effects of the first and the second embodiments are achieved, when the two routes of the first and the second MR sensors 51 and 52 are normal, the steering angle α is constituted by the average value of the calculated value based on the outputs of the two MR sensors and therefore, promotion of accuracy can be achieved in comparison with those of the first and the second embodiments.

Further, when there is a predetermined difference in the calculated values of the two routes, one of the calculated values deviated from the range of the steering angle predicted from the signals of the wheel speed sensors 23 and 24, is excluded as abnormal and therefore, even when a failure is caused in one of the routes, the failed side can be specified, the accurate steering angle is provided an higher reliability is achieved.

Next, an explanation will be given of a fourth embodiment.

According thereto, in contrast to providing the two MR sensors in the previous embodiment, a number of pieces of the MR sensors is set to k which is equal to or larger than 3 in pairs with the respectively corresponding driven gears and in the meantime, signal input of the wheel speed sensor is abolished.

According to the embodiment, similar to the previous embodiment, there are calculated α1, α2, . . . , αk and an average value αx thereof is calculated.

$$\alpha x=(\alpha 1+\alpha 2+\ldots+\alpha k)/k$$

Further, respective differences between the average value αx and α1, α2, . . . , or Δαn=| αx−αn | is calculated. Incidentally, n=1, 2, . . . , k.

By comparing the above-described respective difference with the allowable error, corresponding an is determined as abnormal when Δαn>ε.

The steering angle α is constituted by an average value calculated by excluding an determined to be abnormal from α1, α2, . . . αk.

According to the embodiment, as described above, by providing three or more of the MR sensors, the route of the abnormal MR sensor can be specified. Therefore, similar to the previous embodiment, the steering angle having high accuracy can be detected while dispensing with the signal from the wheel speed sensor.

Further, although according to the second and the third embodiments, the linearly advancing state of the vehicle is detected, or there are used the signals of the vehicle speed sensors 23 and 24 as the sensors for detecting the behavior of the vehicle for calculating the range of the steering angle, in place of the vehicle speed sensor, there may be used a yaw rate sensor frequently used in detecting the behavior of the vehicle in vehicle control similar thereto.

Further, although according to the respective embodiments, an explanation has been given of examples of applying the embodiments to the apparatus of detecting the steering angle of the steering, the invention is not limited thereto but is applicable to various apparatus for detecting a rotational angle exceeding 360 degrees.

Furthermore, although according to the respective embodiments, the MR sensor is provided to the driven gear, the invention is not limited thereto but the magnet may be arranged to the steering shaft per se or a rotating body integral with the steering shaft and the MR sensor may be attached thereto.

Further, in the case of the rotating body constituting an object of measurement other than the steering shaft, the magnet and the MR sensor can also be arranged above a center of a shaft at an end of the shaft.

Further, the invention is not limited to the MR sensor of a magnetic type, in place thereof, a capacitive sensor, an inductive sensor or a resistance sensor or the like can arbitrarily be selected.

As described above, according to the invention, the operating and controlling means subjects detected data of the angle sensor for detecting the periodic angular position to the operational processing by using the reference position stored to the involatile data storing portion, calculates the absolute rotational angle of the rotating body constituting the object of measurement to constitute the measured output, the operating and controlling means switches the mode to the low power consumption mode intermittently operated by receiving the pause signal and therefore, the angle sensor can be constructed by a simple constitution, the angular position of the rotating member is tracked at pertinent intervals and while reducing current consumption, detection of the absolute rotational angle of the rotating body constituting the object of measurement can firmly be continued even in a pause period.

Thereby, for example, in the case of a vehicle, the invention is applied to the steering shaft as the rotating body constituting the object of measurement and after the pause period has been finished, the accurate steering angle can immediately be provided.

Particularly, when a plurality of the angle sensors are constituted and the average value of a plurality of the absolute rotational angles calculated by the operating and controlling means, constitutes the measured output, the accuracy of the measured output is promoted.

Further, when there is the absolute rotational angle in which the difference between a plurality of the calculated absolute rotational angles and the average value is larger than a predetermined value, by excluding the corresponding absolute rotational angle and newly calculating the average value, an abnormal component is excluded and accuracy of the measured output is further promoted.

Further, also when the difference between the calculated absolute rotational angles is larger than a predetermined value, it can be determined that abnormality is caused.

In this case, particularly when the rotating body constituting the object of measurement is constituted by the steering shaft of a vehicle, by calculating the range of the steering angle based on the signal from the sensor for detecting the behavior of vehicle and excluding a signal deviated from the range as abnormal, accuracy of the measured output is further promoted.

Further, with regard to the steering shaft of the vehicle, when the power source is removed and thereafter connected again, the operating and controlling means sets the angular position in the case in which the vehicle is determined to be brought into the linearly advancing state, to the frequency null based on the signal from the sensor for detecting the behavior of the vehicle, thereby, even when the steering shaft is rotated during a time period in which the power source is removed, after starting to run the vehicle, the frequency constituting the basis of operation is correctly reset.

Further, in the low current consumption mode, by supplying the power source to the angle sensor only during a time period of intermittently operating the operating and controlling means, the effect of reducing current consumption is further enlarged.

Further, when the power source voltage is monitored and lowered to the predetermined voltage, by constituting the low current consumption mode, for example, in cranking the engine of the vehicle, the operation is prevented from being unstable.

What is claimed is:

1. A rotational angle measuring apparatus comprising:
   a rotating member rotated in cooperation with a rotating body constituting an object of measurement;
   an angle sensor attached to the rotating member for detecting a periodic angular portion thereof;
   an involatile data storing portion for storing a reference position of the angle sensor; and
   operating and controlling means for subjecting the reference position and detected data from the angle sensor to an operational processing to thereby calculate a frequency of the rotating body constituting the object of measurement and calculating an absolute rotational angle of the rotating body constituting the object of measurement to thereby constitute a measured output;
   wherein the operating and controlling means switches a mode thereof from a normal operation mode for continuously reading the detected data from the angle sensor and executing the operational processing to a low current consumption mode for executing the operational processing by reading the detected data from the angle sensor by an intermittent operation by receiving a pause signal from outside.

2. A rotational angle measuring apparatus comprising:
   a rotating member rotated in cooperation with a rotating body constituting an object of measurement;
   a plurality of angle sensors attached to the rotating member for detecting a periodic angular position thereof;
   an involatile data storing portion for storing a reference position of the angle sensor; and
   operating and controlling means for subjecting the reference position and detected data from the respective angle sensors to an operational processing to thereby calculate a frequency of the rotating body constituting the object of measurement and calculating absolute rotational angles of the rotating body constituting the object of measurement and constituting an average value thereof as a measured output;
   wherein the operating and controlling means switches a mode thereof from a normal operation mode for continuously reading the detected data from the angle sensors and executing the operational processing to a low current consumption mode for reading the detected data from the angle sensors and executing the operational processing by an intermittent operation by receiving a pause signal from outside.

3. The rotational angle measuring apparatus according to claim 2,
   wherein when a difference between the absolute rotational angles based on the rotational angles detected by the respective angle sensors is larger than a predetermined value, the operating and controlling means determines that an abnormality is caused.

4. The rotational angle measuring apparatus according to claim 2,
   wherein when there is present an absolute rotational angle in which a difference between said absolute rotational angle and an average value of the absolute rotational angles based on the rotational angles detected by the respective angle sensors is larger than a predetermined value, the measured output is constituted by an average value of the other absolute rotational angles excluding said absolute rotational angle.

5. The rotational angle measuring apparatus according to any one of claims 1, 2, 3 and 4, wherein the rotating body constituting the object of measurement is a steering shaft, the measured output is a steering angle and the pause signal is a signal for making an ignition switch off.

6. The rotational angle measuring apparatus according to claim 5,
wherein in the low current consumption mode, a power source is supplied to the angle sensor only in the intermittent operation of the operating and controlling means.

7. The rotational angle measuring apparatus according to claim 5,
wherein the operating and controlling means monitors a voltage of the power source and constitutes the low current consumption mode when the voltage becomes lower than a predetermined voltage.

8. The rotational angle measuring apparatus according to claim 3,
wherein the rotating body constituting the object of measurement is a steering shaft of a vehicle, when an abnormality is determined to cause, the operating and controlling means calculates a range of a steering angle based on a signal from a sensor for detecting a behavior of the vehicle and outputs the steering angle as the measured output based on the absolute rotational angle produced by excluding the absolute rotational angle deviated from the range of the steering angle.

9. The rotational angle measuring apparatus according to any one of claims 1, 2, 3, 4, and 8,
wherein in the low current consumption mode, a power source is supplied to the angle sensor only in the intermittent operation of the operating and controlling means.

10. The rotational angle measuring apparatus according to any one of claims 1, 2, 3, 4, and 8,
wherein the operating and controlling means monitors a voltage of the power source and constitutes the low current consumption mode when the voltage becomes lower than a predetermined voltage.

11. The rotational angle measuring apparatus according to claim 9,
wherein the operating and controlling means monitors a voltage of the power source and constitutes the low current consumption mode when the voltage becomes lower than a predetermined voltage.

12. A rotational angle measuring apparatus comprising:
a rotating member rotated in cooperation with a rotating body constituting an object of measurement;
an angle sensor attached to the rotating member for detecting a periodic angular portion thereof;
an involatile data storing portion for storing a reference position of the angle sensor; and
operating and controlling means for subjecting the reference position and detected data from the angle sensor to an operational processing to thereby calculate a frequency of the rotating body constituting the object of measurement and calculating an absolute rotational angle of the rotating body constituting the object of measurement to thereby constitute a measured output;
wherein the operating and controlling means switches a mode thereof from a normal operation mode for continuously reading the detected data from the angle sensor and executing the operational processing to a low current consumption mode for executing the operational processing by reading the detected data from the angle sensor by an intermittent operation by receiving a pause signal from outside;
the rotating body constituting the object of measurement is a steering shaft, the measured output is a steering angle and the pause signal is a signal for making an ignition switch off; and
the operating and controlling means sets a frequency to null by an angular position when the vehicle is determined to be brought into a linearly advancing state based on a signal from a sensor for detecting a behavior of the vehicle when a power source has been removed and thereafter connected again.

13. A rotational angle measuring apparatus comprising:
a rotating member rotated in cooperation with a rotating body constituting an object of measurement;
a plurality of angle sensors attached to the rotating member for detecting a periodic angular position thereof;
an involatile data storing portion for storing a reference position of the angle sensor; and
operating and controlling means for subjecting the reference position and detected data from the respective angle sensors to an operational processing to thereby calculate a frequency of the rotating body constituting the object of measurement and calculating absolute rotational angles of the rotating body constituting the object of measurement and constituting an average value thereof as a measured output;
wherein the operating and controlling means switches a mode thereof from a normal operation mode for continuously reading the detected data from the angle sensors and executing the operational processing to a low current consumption mode for reading the detected data from the angle sensors and executing the operational processing by an intermittent operation by receiving a pause signal from outside;
the rotating body constituting the object of measurement is a steering shaft, the measured output is a steering angle and the pause signal is a signal for making an ignition switch off; and
the operating and controlling means sets a frequency to null by an angular position when the vehicle is determined to be brought into a linearly advancing state based on a signal from a sensor for detecting a behavior of the vehicle when a power source has been removed and thereafter connected again.

14. A rotational angle measuring apparatus comprising:
a rotating member rotated in cooperation with a rotating body constituting an object of measurement;
a plurality of angle sensors attached to the rotating member for detecting a periodic angular position thereof;
an involatile data storing portion for storing a reference position of the angle sensor; and
operating and controlling means for subjecting the reference position and detected data from the respective angle sensors to an operational processing to thereby calculate a frequency of the rotating body constituting the object of measurement and calculating absolute rotational angles of the rotating body constituting the object of measurement and constituting an average value thereof as a measured output;
wherein the operating and controlling means switches a mode thereof from a normal operation mode for continuously reading the detected data from the angle sensors and executing the operational processing to a low current consumption mode for reading the detected data from the angle sensors and executing the operational processing by an intermittent operation by receiving a pause signal from outside;

when a difference between the absolute rotational angles based on the rotational angles detected by the respective angle sensors is larger than a predetermined value, the operating and controlling means determines that an abnormality is caused;

the rotating body constituting the object of measurement is a steering shaft, the measured output is a steering angle and the pause signal is a signal for making an ignition switch off; and the operating and controlling means sets a frequency to null by an angular position when the vehicle is determined to be brought into a linearly advancing state based on a signal from a sensor for detecting a behavior of the vehicle when a power source has been removed and thereafter connected again.

15. A rotational angle measuring apparatus comprising:

a rotating member rotated in cooperation with a rotating body constituting an object of measurement;

a plurality of angle sensors attached to the rotating member for detecting a periodic angular position thereof;

an involatile data storing portion for storing a reference position of the angle sensor; and operating and controlling means for subjecting the reference position and detected data from the respective angle sensors to an operational processing to thereby calculate a frequency of the rotating body constituting the object of measurement and calculating absolute rotational angles of the rotating body constituting the object of measurement and constituting an average value thereof as a measured output;

wherein the operating and controlling means switches a mode thereof from a normal operation mode for continuously reading the detected data from the angle sensors and executing the operational processing to a low current consumption mode for reading the detected data from the angle sensors and executing the operational processing by an intermittent operation by receiving a pause signal from outside;

when there is present an absolute rotational angle in which a difference between said absolute rotational angle and an average value of the absolute rotational angles based on the rotational angles detected by the respective angle sensors is larger than a predetermined value, the measured output is constituted by an average value of the other absolute rotational angles excluding said absolute rotational angle;

the rotating body constituting the object of measurement is a steering shaft, the measured output is a steering angle and the pause signal is a signal for making an ignition switch off; and the operating and controlling means sets a frequency to null by an angular position when the vehicle is determined to be brought into a linearly advancing state based on a signal from a sensor for detecting a behavior of the vehicle when a power source has been removed and thereafter connected again.

16. The rotational angle measuring apparatus according to any one of claims 12, 13, 14, and 15 wherein in the low current consumption mode, a power source is supplied to the angle sensor only in the intermittent operation of the operating and controlling means.

17. The rotational angle measuring apparatus according to any one of claims 12, 13, 14, and 15, wherein the operating and controlling means monitors a voltage of the power source and constitutes the low current consumption mode when the voltage becomes lower than a predetermined voltage.

* * * * *